Nov. 17, 1970  F. KVASNICKA  3,540,331
TOOL POSITIONING DEVICE FOR LATHES OR THE LIKE
Filed Nov. 29, 1968  3 Sheets-Sheet 1
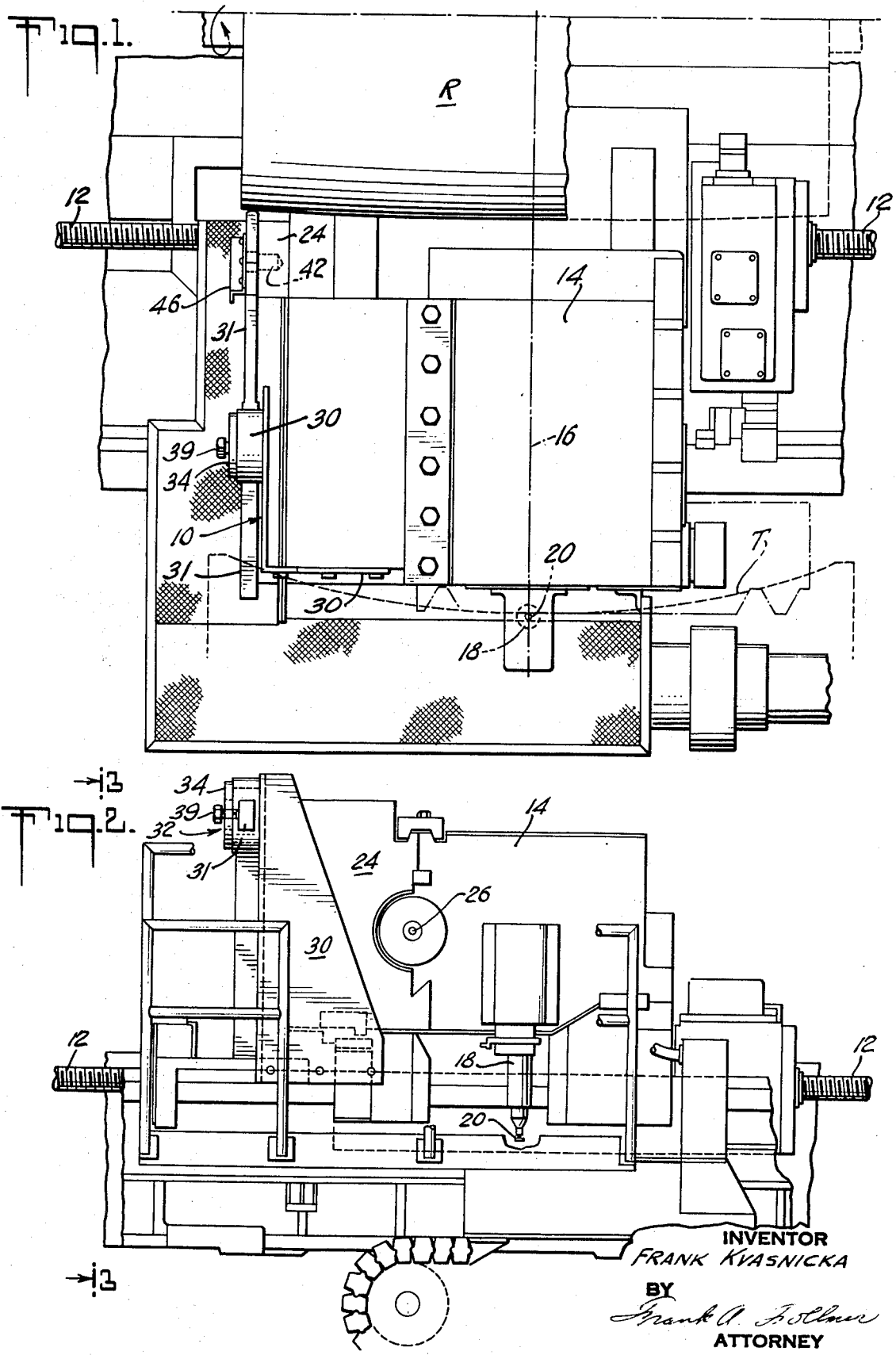
INVENTOR
FRANK KVASNICKA
BY
ATTORNEY

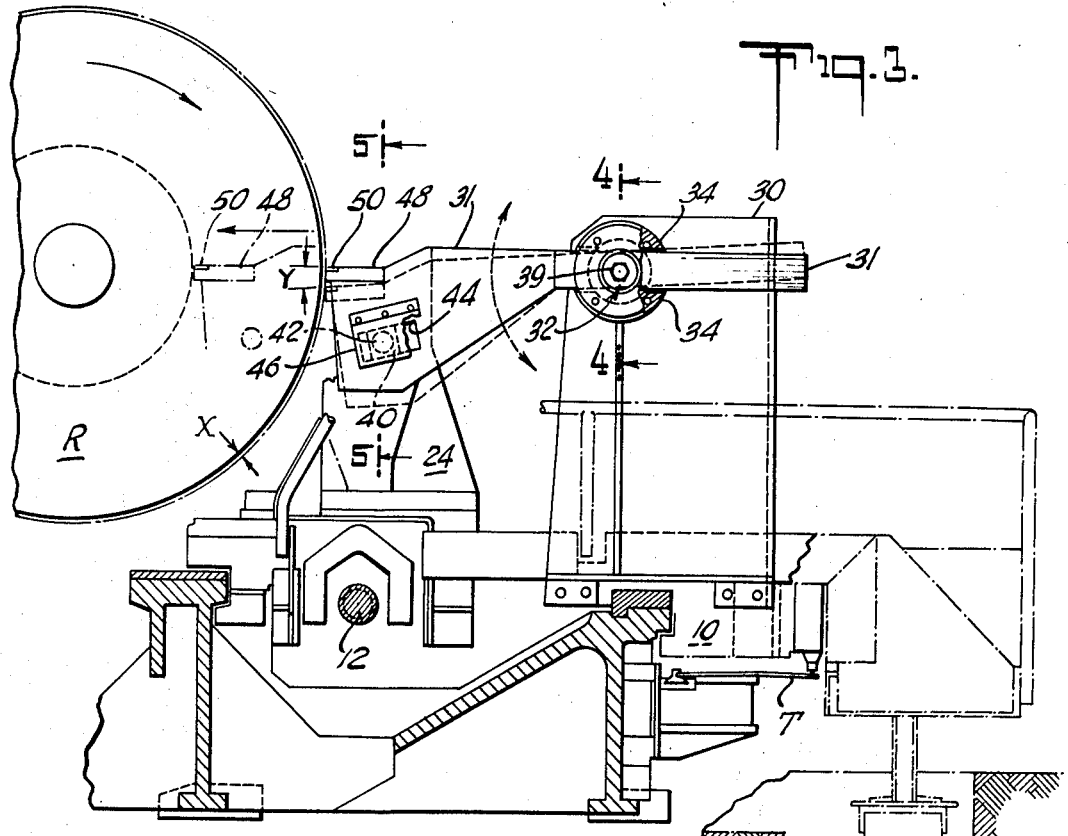
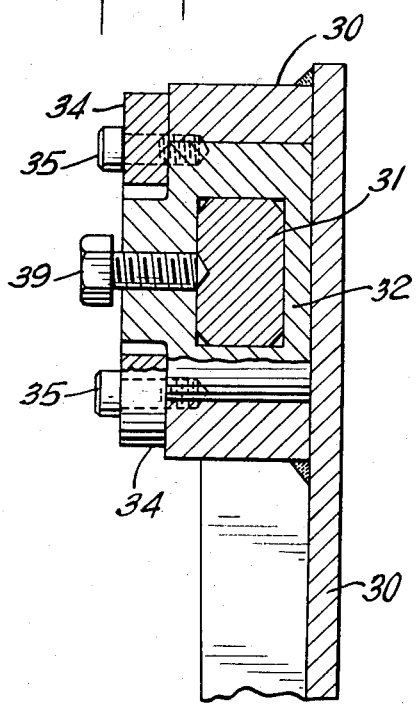
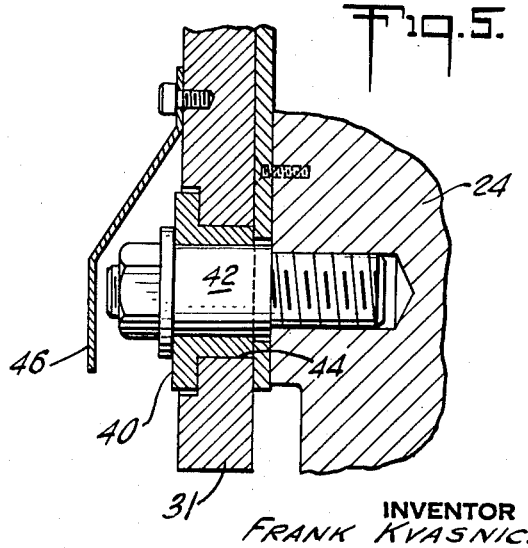

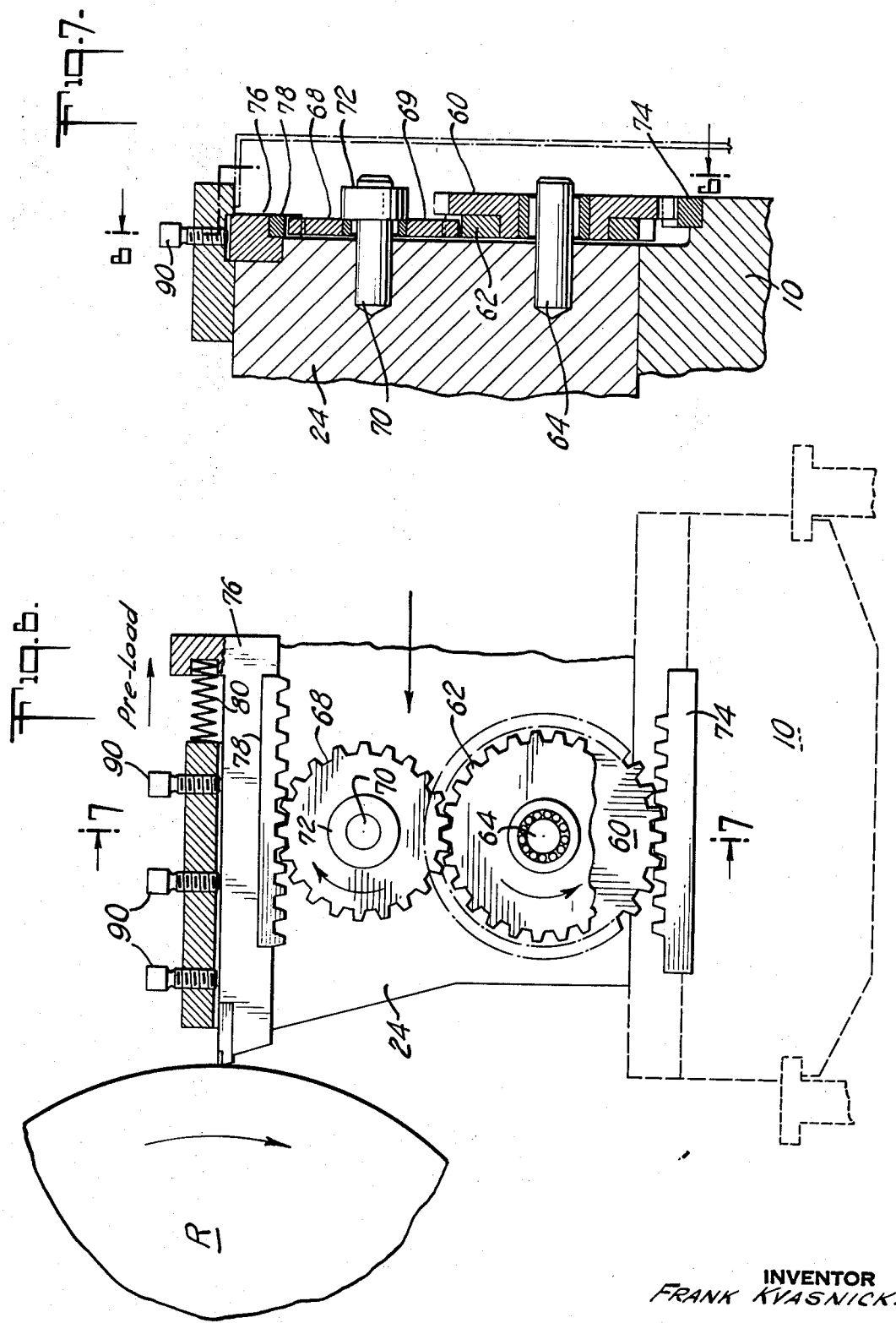

United States Patent Office 3,540,331
Patented Nov. 17, 1970

3,540,331
TOOL POSITIONING DEVICE FOR LATHES OR THE LIKE
Frank Kvasnicka, Mount Lebanon, Pa., assignor to Blaw-Knox Company, Pittsburgh, Pa., a corporation of Delaware
Filed Nov. 29, 1968, Ser. No. 780,019
Int. Cl. B23b 5/36
U.S. Cl. 82—17                                                8 Claims

ABSTRACT OF THE DISCLOSURE

A device for positioning the tool holder of a lathe in response to movement of the lathe cross slide toward or away from the work. A movement transmitting mechanism is connected between the cross slide and the tool holder to cause a very small movement of the tool holder toward or away from the work as compared with the movement of the cross slide whereby a crown cutting operation of a rolling mill roll may be accomplished by means of a roll lathe.

BACKGROUND OF THE INVENTION

The invention relates to devices for positioning the tool of a lathe, or the like, and, more particularly, to a device for positioning the tool holder of a lathe relative to the work as the cross slide of the lathe is moved transversely of the work for the cutting of a crown or taper on the work.

The tracer or tape controlled lathes in use today are limited in the smallness of the taper they can cut with accuracy primarily because of their inability to follow a template, or other types of control input, which will produce the small movement of the cross slide necessary to produce these very small tapers or crowns. These small tapers or crowns are required in many applications, such as in the crowning of rolling mill rolls. Because of the limitation in the present-day lathes in the cutting of tapers, it is necessary to use two machine operations to produce these very small tapers, as in the crowning of rolling mill rolls. Accordingly, present-day procedures involve a first step of turning a crown on the roll on a roll lathe and a second step of finishing the crown on a grinding machine.

SUMMARY OF THE INVENTION

It is the general object of the present invention to provide a device for positioning a tool holder of a lathe relative to the work in response to cross slide movement so as to permit the cutting of very small tapers or crowns. The device in accordance with the invention is constructed so that the crown cutting of a rolling mill roll, for example, may be achieved in a single operation on a roll lathe and thereby eliminate the necessity for using two machines for producing this small taper or crown.

Briefly stated, the device in accordance with the invention comprises movement transmitting means connected between the cross slide of the lathe and the tool holder and constructed and arranged to cause a very small movement of the tool holder toward or away from the work as compared with the transverse movement of the cross slide relative to the work. In other words, while the cross slide will have a relatively large movement in response to the control input thereto (by either tape or template control), the tool holder will only be moved a very small movement toward or away from the work because of the differential-type movement transmitting means.

More specifically, the invention achieves the differential movement by two forms of movement transmitting mechanisms. One form in accordance with the invention involves an arrangement whereby the tool holder is pivotally mounted so that the tool supported thereby is moveable upwardly and downwardly relative to the work whereby the tool engages the work at various vertical locations, the tool holder being connected to the cross slide so as to be responsive to cross slide movement. The arrangement in accordance with this first form is such that while the tool may be moved through a substantial vertical movement during the pivoting, its movement in a radial direction, toward or away from the work is a very small amount to thereby achieve the differential movement discussed above. In accordance with another form of the invention there are provided a gear mechanism which produces a differential movement in response to the movement of the cross slide and transmits such movement to the tool holder so as to cause a small movement of the tool toward or away from the work in response to the movement of the cross slide.

BRIEF DESCRIPTION OF THE DRAWINGS

FIG. 1 is a fragmentary plan view of a portion of a lathe having the tool positioning mechanism in accordance with the invention;

FIG. 2 is a front elevation of the lathe mechanism shown in FIG. 1;

FIG. 3 is a sectional view taken on line 3—3 of FIG. 2;

FIG. 4 is a sectional view taken on line 4—4 of FIG. 3;

FIG. 5 is a sectional view taken on line 5—5 of FIG. 3;

FIG. 6 is a partly diagrammatic illustration of a second form of tool positioning mechanism in accordance with the invention; and FIG. 7 is a sectional view taken on line 7—7 of FIG. 6.

DESCRIPTION OF THE PREFERRED EMBODIMENTS

Referring to FIGS. 1 to 5, there is shown one form of the invention as utilized in a typical roll lathe which is controlled by means of a template. In this type of lathe there is provided the usual headstock and tailstock for supporting the roll R, and a carriage 10 which is moved along longitudinal ways by a longitudinal feed screw 12. A cross slide 14 is mounted on the carriage 10 for transverse movement along the usual infeedways by means of a cross feed screw, the center line of which is indicated at 16 in FIG. 1. The cross slide 14 is fed by the cross feed screw transversely relative to the roll R by conventional means such as a motor driving the cross feed screw through gears to thereby cause transverse movement of the cross slide.

There is also provided conventional means for controlling the movement of the cross slide in accordance with a desired input in the form of a template T. This conventional means comprises a tracing head 18 fastened on the lathe carriage and comprising the stylus 20 flexibly suspended thereon so that it may be deflected to contact the template T and follow the shape thereof. The mechanism comprises electrical pickups to indicate electrically the amount and direction in which the stylus is deflected and there is provided an electronic systems to interpret these signals and to control the drive of the motor system which drives the cross feed screw and the longitudinal feed screw.

There is also provided the usual tool post 24 which is mounted on the cross slide 14 by interfitting portions and is guided by infeedways for transverse movement relative to the work along with the cross slide 14. Suitable means 26 may be provided for adjusting the position of the tool post with respect to the cross slide to accommodate different size rolls. However, after the cross slide 14 and the tool post 24 are mounted together, they move conjointly.

The lathe mechanism described above is conventional wherefore any more detailed description thereof is deemed unnecessary.

In accordance with the invention, means are provided for transmitting the movement of the cross slide 14 to a tool holder in a manner such that the tool is moved radially toward or away from the roll R in a ratio of movement very substantially less than the movement of the cross slide. Such means comprises a bracket 30 secured, as by mounting screws, to the carriage 10. A tool bar 31 is pivotally mounted on the bracket 30 by a pivot means indicated generally at 32. The tool bar supporting means 32 is provided with a rectangular passageway therethrough for receiving a straight rectangular portion of the tool bar 31 for slidable movement therein. The tool bar supporting means 32 is retained in position within the bracket 30 an annular retainer 34 secured to the bracket 30 by screws 35 as is best shown in FIG. 4. The tool bar 31 is held in a desired fixed position within the means 32 by a clamping screw 39 which is threadedly engaged within member 32 and is adapted to frictionally engage the straight portion of the tool bar 31 at desired locations.

Means are provided for moveably supporting the forward end of the tool bar 31 on the tool post 24, such means comprising a block 40 secured to the tool post 24 by a mounting screw 42. The block 40 has parallel upper and lower walls slidably received in an elongated straight-sided slot 44 formed in the tool bar 31. A protective cover 46 is secured to the tool bar 31 and overlies the slot 44 and the slidable block 40 so as to shield the same from the chips produced during a roll turning operation. The elongated slot 44 is formed to extend at an angle of approximately 15° relative to the path of movement of the cross slide toward and away from the work, which movement is in a horizontal direction.

Mounted on the forward end of the tool bar 31 is a tool holder 48 which carries a cutting tool 50 for contact with the roll R. The tool 50 is made of a suitable material and construction as is well known in the art for obtaining a very fine finish.

The following description of the operation of the form of the invention shown in FIGS. 1 to 5 will relate to the cutting of a crown on the roll R, although it will be apparent that the invention will have broader application to the cutting of tapers or the like. The shape of the crown is determined by the shape of the template T, and during a crown cutting operation, the stylus 20 will follow the template shape and control the movement of the cross slide 14 toward or away from the roll in accordance with the crown shape formed on the template T. By reason of the construction in accordance with the invention, the crown shape formed on the template T may be substantially larger than the crown to be formed on the roll R as is apparent from a consideration of FIG. 1. This is because of the differential movement between a cross slide 14 and the tool 50 transversely relative to the work. Further, because of the relatively large crown shape that may be formed on the template T, the cross slide will be able to follow a template shape within the acceptable range of accuracy of the lathe. In other words the arrangement operates within a range of movement that the tracer system can follow with accuracy.

Let it be assumed that the cross slide 14 is in a forward position and is moving away from the roll as is shown by the arrangement in FIG. 3, which would occur when the tool is moving longitudinally from the center toward an end of the roll. In this case, the parts are arranged so that the tool holder 48 is approximately horizontal and the tool 50 engages the roll at approximately the horizontal central plane thereof. Thus, as the cross slide 14 moves in a retracting direction as indicated by the arrow in FIG. 3 the tool post 24 is also moved therewith so that the block 40 acting in slot 44 will cause a downward movement of the tool bar 31 and the tool 50. It will be apparent that this downward movement of the tool 50 will be less than the retracting movement of the cross slide 14 because of the relatively small angle (approximately 15°) of the slot 44 relative to the path of movement of the cross slide 14. This is the first ratio of differential movement provided between the cross slide 14 and the tool 50 in accordance with the objectives of the invention. It will be noted that the pivotal movement of the tool bar 31 is about the pivot means 32.

As is shown in FIG. 3, the overall downward movement of the tool bar 31 and tool 50 during the retracting movment of the cross slide 14 will be a distance Y, while the tool 50 is actually moving away from the roll R the much smaller distance X, which represents the movement of the tool 50 in a radial direction away from the roll R. In other words, what happens is that the tool 50 is actually cutting the roll R at a location below the horizontal central plane thereof. Thus, in accordance with the device of invention, there is achieved a second differential movement between the cross slide movement relative to the roll and the amount of tool movement radially relative to the roll.

A rough calculation will demonstrate the appreciable difference between the ratio of movement of the cross slide 14 and the tool 50 with respect to the roll. Thus, for a tool bar 31 having a thirty inch radius between its pivot point and the cutting edge of the tool 50 and arranged to turn a roll R of a thirty inch radius, the tool 50 will cooperate with the roll R to move through a vertical movement Y of about ¼ of an inch and only move radially relative to the roll a distance X of about one thousandth of an inch. Moreover, in this example, the tool post 24 will move transversely about three quarters of an inch to produce this movement by means of the sliding block arrangement. Thus, the possibilities for differential transmission of movement are obviously substantial.

The construction in accordance with the invention thus produces a device which can be used in a roll lathe to achieve very accurate tapers or crowns and permit the use of the lathe, for example, to crown rolls of a rolling mill. Furthermore, the accuracy of the template is not particularly critical because an error in the template is reduced by a very high ratio. Moreover, it is to be noted that tape controlled lathes will also not encounter the problems of producing very small inputs by the utilization of the device in accordance with the invention, which is also applicable to tape controlled lathes.

Another form of the invention is shown in FIGS. 6 and 7 wherein a differential movement transmitting means involving the use of gears is shown. The device is mounted on the lathe in a manner similar to that described with respect to the embodiment shown in FIG. 1 but the construction to produce the differential movement is entirely different. In this form of the invention the device comprises a pair of gears 60 and 62 mounted on a pin 64 for conjoint movement. The pin 64 is mounted on the tool post 24 of the lathe and supports the gears 60 and 62 by means of suitable roller bearings 66. A third gear 68 is rotatably mounted by bearings 69 on a pin 70 mounted on the tool post 24 at a location directly above the pin 64, the gear 68 being constructed and arranged to mesh with gear 62. A clutch mechanism 72 is provided for disengaging the gear 68 from the gear 62 as desired, although for normal operation in accordance with the objectives of the invention, these gears are in engagement. A rack 74 is fixedly mounted on the carriage 10 and is arranged for engagement with the gear 60.

A tool slide 76 is slidably mounted in a recess within the tool post 24 and carries a rack 78 fixedly mounted thereon. The rack 78 is arranged to mesh with the upper gear 68. Means are provided for biasing the tool slide 76 in a rearward direction away from the roll R within the recess in the tool post 24, which arrangement serves to maintain all the gears in contact so as to eliminate backlash in the gearing. The biasing means shown comprises a spring 80 which provides a sufficient load substantially greater than the expected tool forces for achieving the anti-backlash operation.

The gears 60 and 62 are constructed so that the gear 62 has a slightly small diameter whereby as the gears rotate conjointly, the peripheral movement at the pitch line of the smaller gear 62 is slightly less than the pitch line movement of the larger gear 60. Desirably, this difference in size may be very little, such as for example, the smaller gear may have only one less tooth along with the appropriate diameter for such a construction.

In the operation of the form of the invention shown in FIGS. 6 and 7, let it be assumed that the cross slide is moving inwardly toward the roll R. Accordingly, the tool post 24 moves inwardly with the cross slide so that the pins 64 and 70 and the gears carried thereby also move inwardly toward the roll at the same rate as the tool post. Thus, the gear 60 will be rotated in a counterclockwise direction as shown in FIG. 6 by reason of its engagement with the fixed rack 74 on the carriage. The smaller gear 62 will rotate conjointly with the gear 60 and drive the gear 68 in a clockwise direction. This upper gear 68 will cause the tool slide 76 to move rearwardly relative to the tool post 24 an amount determined by the peripheral movement of the gear 68.

It will thus be apparent that there is a differential movement between the tool slide 76 and the tool post 24. The amount of this differential movement is dependent of the difference in the sizes of the gears 60 and 62. This is apparent by considering that the peripheral movement of the gear 60 is the same as the movement of the tool post 24 by reason of the engagement of gear 60 with the fixed rack 74. However, since the gear 62 is smaller than gear 60 its pitch line velocity or movement will be slightly less than that of the gear 60. Moreover, the peripheral movement of the gear 68 is transmitted through the rack 78 to the tool slide 76. Thus, while the tool slide 76 is moving with the tool post 24 toward the roll R, this movement has subtracted therefrom the movement produced by the gear 68 which actuates the tool slide 76 rearwardly relative to the tool post 24. Moreover, the amount of the subtracted movement is dependent upon the size of the gear 62. Thus, the total movement of the tool slide 76 toward the roll is equal to the movement of the tool post (which is the same as the movement at the pitch line of the large gear 60) minus the peripheral movement produced by the gear 68 on the tool slide 76 (which movement is the same as the movement at the periphery of gear 62). Thus, the differential movement is dependent on the slight difference between the sizes of the gears 60 and 62 and the smaller this difference in size, the greater the ratio of differential movement.

It will thus be apparent that since gears may be made with very little difference in size, the potential differential movement that can be achieved in accordance with the invention is substantial.

Means are provided for adapting the mechanism shown in FIGS. 6 and 7 for operation with a lathe with a 1:1 ratio of template to tool movement. To this end, the gear 68 may be disengaged from the gear 62 by the operation of the clutch means 72 and the tool slide 76 may be fixedly secured to the tool post by means of a plurality of clamping screws 90.

It will be apparent that the form of the invention shown in FIGS. 6 and 7 will achieve all of the advantages shown in FIGS. 1–5. Furthermore, it will be noted that this form of the invention can be made as a self-contained attachment for conventional lathes.

It has to be understood that the above description is illustrative and it will be apparent that various changes may be made in the construction and arrangement of parts without departing from the scope of the invention.

Accordingly it is not desired to be limited except as required by the following claims.

I claim:

1. Apparatus for use in a machine tool having a carriage moveable longitudinally relative to the work to be turned, a cross slide mounted on the carriage and moveable transversely relative to the work to be turned, and a tool post mounted for movement with said cross slide transversely relative to the work, comprising a cutting tool, a tool holder for said cutting tool, and means interconnecting said cross slide and said tool holder including differential movement transmitting means for causing said tool to move radially toward or away from the work in response to the movement of said cross slide relative to said work in a ratio of movement very substantially less than the cross slide movement.

2. Apparatus according to claim 1 wherein said tool holder is mounted on said tool post for movement therewith.

3. Apparatus according to claim 2 wherein said movement transmitting means, pivotally mounted means for supporting said tool holder and means for causing said pivotally mounted means to pivot in response to movement of the cross slide transversely relative to said work, said tool holder supporting means being arranged to position said tool holder with the tool in cutting engagement with the work at one position thereof and to pivot downwardly from said one position while maintaining cutting engagement with said work whereby said tool engages the work at various vertical locations.

4. Apparatus according to claim 3 wherein said means for causing the pivotal movement of the tool holder supporting means comprises a slot formed in the tool holder supporting means and a block means carried by said tool post and slidably received in said slot.

5. Apparatus according to claim 4 wherein said slot extends at a relatively small acute angle relative to the path of movement of the cross slide.

6. Apparatus according to claim 2 wherein said differential movement transmitting means, means for supporting the tool holder for sliding movement on said tool post toward and away from the work, a pair of gears, one of said gears having a smaller diameter than the other, the large diameter gear being arranged in engagement with the carriage for movement in response to the relative movement between said carriage and said cross slide, the smaller diameter gear being in engagement with the said tool slide for transmitting the movement thereof to said tool slide in a direction opposite to the movement of the tool slide with the tool post.

7. Apparatus according to claim 6 wherein said means for driving the tool slide relative to the tool post comprises a gear meshed with said small diameter gear and in driving engagement with said tool slide.

8. Apparatus according to claim 7 wherein said means for providing driving engagement between said third gear and said tool slide comprises a rack fixedly mounted on the tool slide and meshing with said smaller diameter gear, and said means for providing driving engagement between said larger diameter gear and said carriage comprises a rack mounted on the carriage and meshing with said larger diameter gear.

References Cited

UNITED STATES PATENTS 971,887  10/1910  Hanson _____ 82—17

JAMES M. MEISTER, Primary Examiner

U.S. Cl. X.R.

82—16